3,705,197
BIS(2-FLUORO-2,2-DINITROETHYL) FORMAL PREPARATION
Lloyd A. Kaplan, Silver Spring, and Robert E. Oesterling, Adelphi, Md., assignors to the United States of America as represented by the Secretary of the Navy
No Drawing. Filed Mar. 31, 1964, Ser. No. 357,016
Int. Cl. C07c 41/00, 43/12
U.S. Cl. 260—615 A          10 Claims The invention described herein may be manufactured and used by or for the Government of the United States of America for governmental purposes without the payment of any royalties thereon or therefor.

This invention relates to an improved method for preparing bis (2-fluoro-2,2-dinitroethyl) formal (FEFO) of consistently high purity. FEFO is an energetic compound of importance because of its ordnance applications. The compound is an explosive per se and, because of its high energy content, is useful as a plasticizer in the preparation of high energy propellant binders.

During the past few years, three general procedures for the preparation of FEFO have been developed.

The basic method for the preparation of FEFO involved the reaction of a negatively-substituted alcohol such as fluorodinitroethyl alcohol with formaldehyde, or a polymer of formaldehyde, in a solution of concentrated sulfuric acid. (Ser. No. 173,592, filed Feb. 15, 1962, now U.S. Pat. No. 3,526,667, and commonly assigned.) This procedure is an excellent process for the preparation of FEFO but is seriously hampered by the lack of availability of large quantities of fluorodinitroethyl alcohol. As a result, the procedure is not readily amenable to large scale production.

Subsequently, it was found that FEFO could be prepared by aqueous fluorination of the alkali metal salts of bis-(2,2,2-trinitroethyl) formal, such as bis(2-sodium-2,2-dinitroethyl) formal (Ser. No. 243,196, filed Dec. 4, 1962, now U.S. Pat. No. 3,541,160, and commonly assigned). This procedure overcame the scale-up problem associated with the scarcity of fluorodinitroethanol, but was somewhat hazardous in that it entailed the handling of the sensitive alkali metal salts. Moreover, the purity of the final product was inconsistent.

Finally, it was discovered that FEFO could be prepared by a simpler and less hazardous "one pot" synthesis which comprised reducing bis(2,2,2-trinitroethyl) formal with sodium hydroperoxide in aqueous methanol, removing the methanol and fluorinating the resultant solution of bis(2-alkali metal-2,2-dinitroethyl) formal. It was soon found, however, that the FEFO prepared by this method was contaminated with fluorodinitromethane, fluorodinitroethanol and formaldehyde, the contaminants having been formed by side reactions which occurred during the reduction step and/or during the methanol removal step. (Ser. No. 220,944, filed Aug. 29, 1962, now U.S. Pat. No. 3,373,209, and commonly assigned.)

In copending application Ser. No. 312,790, filed Sept. 30, 1963, now U.S. Pat. No. 3,288,863, the preparation of 2,2,8,8 - tetranitro - 4,6 - dioxa-1,9-nonanediol (dinol) is accomplished by the reduction of a bis(trinitroalkyl) formal in an alkaline hydroperoxide solution to obtain the corresponding di-alkali metal salt and then reacting the salt with formaldehyde at an acid pH. Dinol, whether anhydrous or in its monohydrate form, is a safe, stable, storable compound.

It has now been found that the dissolution of dinol in an aqueous medium having a pH greater than 7 yields a solution consisting of bis(2-alkali metal-2,2-dinitroethyl) formal and formaldehyde. This solution does not contain the contaminants normally associated with the preparation of bis(2-alkali metal-2,2-dinitroethyl) formal by the general procedures outlined above. The only possible contaminant in the solution is formaldehyde, and, being extremely soluble in water, it is held in solution and does not affect the subsequent reaction.

Fluorination of the solution of bis(2-alkali metal-2,2-dinitroethyl) formal yields FEFO of superior purity than that obtained by any previous method.

Thus, by the method of this invention, it is now possible to produce high purity FEFO from a material which is stable and storeable and without the complications implicit in the scarcity of starting material and contaminant formation of the previous methods. Moreover, the process of this invention does not involve the use of methanol as a solvent and the methanol removal operation of the prior methods has thus been eliminated.

A specific embodiment of the invention is illustrated by the following example, but it is to be understood that the scope of the invention is not intended to be limited thereby.

Preparation of bis(2-fluoro-2,2-dinitroethyl) formal

A solution of 0.1 mole of dinol and 0.3 mole of sodium carbonate in 400 ml. of water was fluorinated at 5° to 10° C. with a nitrogen-fluorine (3:1) gas stream in a one-liter flask fitted with a stirrer, thermometer, a subsurface gas inlet tube and a gas exit port connected to a trap and vented to the atmosphere.

The pH of the original yellow-orange solution was of a value of between 9 and 10 and during the fluorination, at 15-minute intervals, the pH was checked and 30 ml. aliquots of 10% sodium carbonate solution were added to maintain the pH at a value greater than 8. After 2 hours, the reaction mixture had bleached to a milky white and a final portion of the sodium carbonate solution was added to adjust the pH of the mixture to a value of between 9 and 10. The fluorination was the continued for several minutes longer to insure complete reaction.

The reaction mixture was then extracted with three 50 ml. portions of methylene chloride and the combined methylene chloride extracts were washed with three 50 ml. liter portions of water, dried over magnesium sulfate and the solvent was evaporated in vacuo at 50° C. to yield 27 g. (84% of theoretical) of FEFO of a purity of 93%.

It is essential that dinol be fluorinated at an alkaline pH since only in basic solutions is dinol completely dissociated to salts of bis(2,2-dinitroethyl) formal. At acid pH values the rate of fluorination is decreased.

Further, during the fluorination of dinol efficient stirring is essential in order to increase the uptake of fluorine and prevent localized areas of high acidity from forming in the reaction medium.

In lieu of sodium carbonate other alkali metal salts such as lithium carbonate, potassium carbonate, the alkali metal hydroxides and the alkali metal bicarbonates may be used. In fact, any buffer may be used which will maintain the desired pH and will not react with the fluorine in the system.

The molar ratio of dinol to buffer is one mole of dinol to two or more moles of buffer. Generally an excess of alkali is initially added in order to insure complete deformylation of dinol and additional alkali is then added as needed during the fluorination in order to maintain the pH at the proper level.

The fluorination of dinol is generally run at ambient temperature or below and usually in the range of about 0°–25° C., although the preferred range is 5°–10° C.

Although water is the preferred reaction medium, an aqueous solution of dimethylsulfoxide (1:1) may be used in lieu thereof.

Obviously, many modifications and variations of the present invention are possible in the light of the aboveteachings. It is therefore to be understood that, within the scope of the appended claims, the invention may be practiced otherwise than as specifically described.

Having thus described the invention, what is claimed and desired to be secured by Letters Patent of the United States is:

1. The method of preparing bis(2-fluoro-2,2-dinitroethyl) formal of high purity which comprises dissolving 2,2,8,8-tetranitro-4,6-dioxa-1,9-nonanediol in an alkaline reaction medium and fluorinating the resultant solution.

2. The method of claim 1 wherein the 2,2,8,8-tetranitro-4,6-dioxa-1,9-nonanediol is anhydrous.

3. The method of claim 1 wherein the 2,2,8,8-tetranitro-4,6-dioxa-1,9-nonanediol is in the monohydrate form.

4. The method of claim 1 wherein the reaction temperature is maintained within the range of 0°–25° C.

5. The method of claim 1 wherein the reaction temperature is maintained at 5°–10° C.

6. The method of claim 1 wherein the alkaline reaction medium is maintained at a pH of 8–10.

7. The method of claim 1 wherein the alkaline reaction medium is an aqueous solution of a buffering agent selected from the group consisting of the alkali metal carbonates, the alkali metal bicarbonates, and the alkali metal hydroxides.

8. The method of claim 1 wherein the molar ratio of 2,2,8,8-tetranitro-4,6-dioxa-1,9-nonanediol to buffering agent is at least 1:2.

9. The method of claim 8 wherein the alkaline reaction medium is an aqueous solution of dimethylsulfoxide and a buffering agent.

10. The method of claim 9 wherein the ratio of water to dimethylsulfoxide is 1:1.

References Cited
UNITED STATES PATENTS 3,523,808    8/1970   Gold et al. _____ 260—615 A LELAND A. SEBASTIAN, Primary Examiner U.S. Cl. X.R.
149—88